United States Patent [19]

Ueda et al.

[11] Patent Number: 4,963,978
[45] Date of Patent: Oct. 16, 1990

[54] COLOR CORRECTION CIRCUIT

[75] Inventors: Osamu Ueda; Teruo Hieda, both of Kanagawa, Japan

[73] Assignee: Canon Kabushiki Kaisha, Tokyo, Japan

[21] Appl. No.: 387,716

[22] Filed: Jul. 31, 1989

[30] Foreign Application Priority Data

Aug. 8, 1988 [JP] Japan .................................. 63-196027

[51] Int. Cl.$^5$ .............................................. H04N 9/73
[52] U.S. Cl. ........................................ 358/29; 358/80
[58] Field of Search ............................... 358/27, 29, 80

[56] References Cited

U.S. PATENT DOCUMENTS

| 4,488,245 | 12/1984 | Dalke et al. | 358/80 |
| 4,525,736 | 6/1985 | Korman | 358/28 |
| 4,602,277 | 7/1986 | Gurchard | 358/29 |
| 4,700,219 | 10/1987 | Tanaka et al. | 358/29 |
| 4,812,902 | 3/1989 | Fuchsberger | 358/80 |
| 4,839,721 | 6/1989 | Abdulwahab et al. | 358/80 |
| 4,908,701 | 3/1990 | Udagawa | 358/80 |

Primary Examiner—John W. Shepperd
Attorney, Agent, or Firm—Robin, Blecker, Daley & Driscoll

[57] ABSTRACT

A color correction circuit featured by a correction signal generator for outputting a correction signal in accordance with the input color video signal, and an adder for adding the correction signal to the input color video signal.

14 Claims, 4 Drawing Sheets

COLOR CORRECTION CIRCUIT

BACKGROUND OF THE INVENTION

1. Field of the Invention

The present invention relates to a color correction circuit for correcting colors indicated by a video signal.

2. Description of the Related Art

In general, a luminance signal of a color video signal is formed by separating the colors of an object image into the colors red, green, and blue, and mixing, in a certain proportion, primary-color signals, i.e., a red signal, a green signal and a blue signal, indicative of these colors. On the other hand, color-difference signals of a color video signal are each formed by subtracting the luminance signal from the red signal, or subtracting the luminance signal from the blue signal.

However, color video cameras employ various systems for sensing images. With certain types of image sensing systems or certain adjustment conditions of color video cameras, during the forming of a luminance signal, the red, green and blue signals are mixed in a proportion different from the normal proportion. The resultant video signal possesses certain color reproducibility in which, when the video signal forms an image, the colors of the reproduced image are different from those of the original image. In this way, it is necessary to effect color correction.

SUMMARY OF THE INVENTION

The present invention aims to provide a color correction circuit ensuring that color correction is effected easily while the video signal concerned is in the stage of a luminance signal and color-difference signals.

According to one aspect of the present invention, a color correction circuit is featured by a correction signal generating means for outputting a correction signal in accordance with the input color video signal, and an adding means for adding the correction signal to the input color video signal.

With the above-mentioned arrangement, a correction signal which is necessary to the intended color correction can be obtained from the correction signal generating means. Accordingly, when the correction signal is added to the input color video signal by the adding means, the desired color correction can be accomplished. Since the correction signal generating means can be formed using, e.g., a memory, the entire circuit embodying the present invention has a very simple structure, thereby facilitating manufacture, and the alteration or correction of the contents of the memory.

In accordance with another aspect of the present invention, the input video signal can be subjected to color correction freely as desired by a circuit having a simple structure. Specifically, certain color correction data capable of compensating for the color characteristics of the image sensing device combined are used, thereby attaining accurate color reproducibility. When the color correction data is suitably changed, it is possible to attain different correction characteristics or produce special effect images through image modification. Furthermore, if the memory contents are simply altered (by such a method as rewriting or memory replacement), the entire circuit is made compatible with cameras employing different image sensing systems, and this is very advantageous in practice.

The above and other objects and features of the present invention will appear more fully from the following detailed description, taken in connection with the accompanying drawings.

DETAILED DESCRIPTION OF THE PREFERRED EMBODIMENTS

The preferred embodiments of the present invention will now be described with reference to the drawings.

Figure 1:
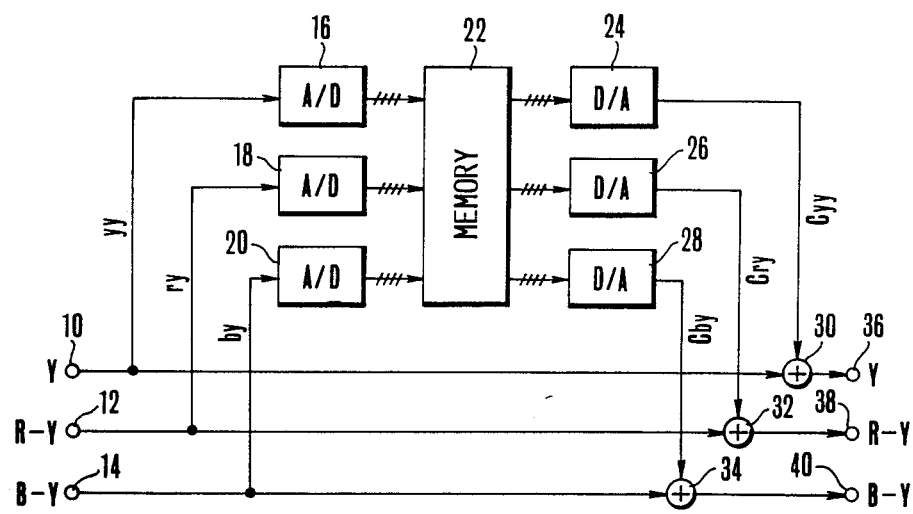
FIG. 1 is a block diagram showing the structure of a first embodiment of the present invention.

FIG. 1 is a block diagram showing the structure of a color correction circuit in accordance with a first embodiment of the present invention. The color correction circuit has an input terminal 10 for a luminance signal Y, an input terminal 12 for a color-difference signal indicative of $R-Y$ (hereinafter simply referred to as "color-difference signal $R-Y$"), and an input terminal 14 for a color-difference signal $B-Y$. The color correction circuit also has 4-bit A/D (analog-to-digital) converters 16, 18 and 20, a memory 22 storing correction values, 4-bit D/a (digital-to-analog) converters 24, 26 and 28, and adders 30, 32 and 34 for adding a correction value to each of the signals input through the input terminals 10, 12 and 14. An output terminal 38 is provided to allow the corrected color-difference signal $R-Y$ to be output therethrough, while an output terminal 40 is provided to allow the corrected color-difference signal $B-Y$ to be output therethrough.

Figure 2:
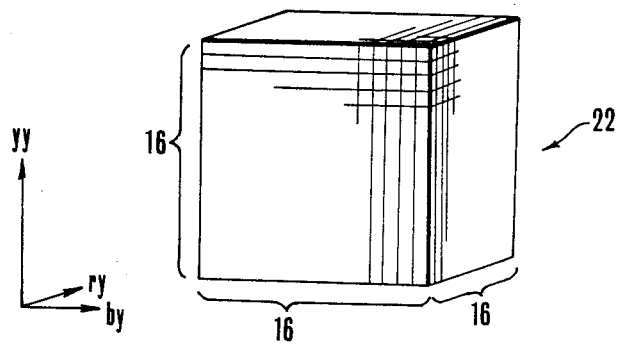
FIG. 2 is a view showing an image of correction data stored in a memory 22, shown in FIG. 1.

The memory 22 used in this embodiment is capable of storing $4,096 \times 4$ bits of data. FIG. 2 shows an image of correction data stored in the memory 22. The correction data is stored in areas set in a space defined by a "yy" coordinate axis representing the value of the input luminance signal Y, and "ry" coordinate axis representing the value of the input color-difference signal $R-Y$, and a "by" coordinate axis representing the value of the input color-difference signal $B-Y$.

In the following description of the operation of the circuit shown in FIG. 1, it is assumed that a single-plate complementary-color mosaic-type color video camera serves as the source of a luminance signal and color-difference signals which are to be subjected to color correction by the circuit. Consideration has to be given first to the fact that a color video camera of the above-mentioned type has certain color reproducibility which differs in the following three points from the correct color reproducibility of a color video camera. First, in a case where an indoor light-source is used, because of difference in the proportion of the red and blue components, the saturation of the reproduced color red is lowered. Secondly, since the characteristics of color separation filters of the image sensing device of the camera are such that they are relatively deviated to the blue side, the resultant green-cyan is bluish. Lastly, since the output of the image sensing device has a high level of color modulation, the saturation of the reproduced color blue is too high as compared with those of other colors.

Figure 3A:
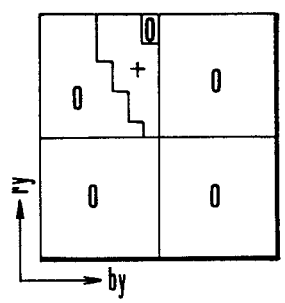
FIGS. 3(a), 3(b) and 3(c) are views used to explain correction data stored in the memory 22.
Figure 3B:
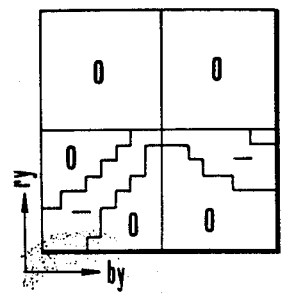
Figure 3C:
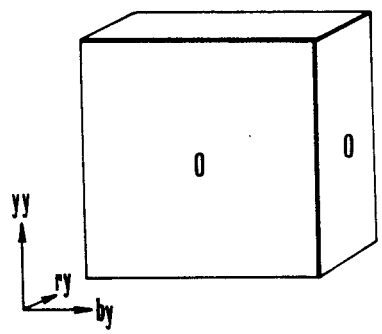

FIGS. 3(a), 3(b) and 3(c) show data stored in the memory 22 in order to correct these three differences. FIG. 3(a) shows the distribution of data for correcting the color-difference signal R−Y at a certain luminance, FIG. 3(b) shows the distribution of data for correcting the color-difference signal B−Y at a certain luminance, and FIG. 3(c) shows the distribution of data for correcting the luminance signal Y. In FIGS. 3(a) and 3(b), a symbol "+" indicates that positive correction data is stored in the corresponding region, while a symbol "−" indicates that negative correction data is stored in the corresponding region.

Descriptions will be given of the case in which, for instance, a video signal resulting from the conversion of an image of a red object into an electrical signal by a single-plate complementary-color mosaic-type color video camera and output from the camera, is corrected using the correction data shown in FIGS. 3(a), 3(b) and 3(c). A luminance signal Y as well as color-difference signals R−Y and B−Y, which constitute the video signal output from the single-plate complementary-color mosaic-type camera, are input to the input terminals 10, 12 and 14, respectively, that are shown in FIG. 1. The input signals are each converted into 4-bit digital signals by the associated A/D converters 16, 18 and 20. The digital signals are input to the memory 22, and the memory 22 outputs the data stored in areas corresponding to the addresses indicated by the respective outputs of the A/D converters 16, 18 and 20. The data output by the memory 22 consists of certain correction values. If the correction value for correcting the luminance signal Y is represented as Cyy, the correction value for correcting the color-difference signal R−Y is represented as Cry, and the correction value for correcting the color-difference signal B−Y is represented as Cby, since the object in this case is a red object, Cyy is equal to 0, Cry is a positive (+) value, and Cby is equal to 0.

The correction data Cyy, Cry and Cby output from the memory 22 are converted into analog signals by the D/A converters 24, 26 and 28, respectively, and are then applied to the associated adders 30, 32 and 34. Since the adders 30, 32 and 34 are connected directly to the input terminals 10, 12 and 14, they add the respective correction data to the original values of the signals. In the example being explained, by the above-described operation, the value of the color-difference signal R−Y is increased by the addition of the correction data Cry, thereby increasing the saturation of red.

In a case where the camera outputs a video signal resulting from the conversion of an image of a green object, correction is effected in a similar manner, and the value of the color-difference signal B−Y is reduced. By this operation, it is possible to prevent the reproduced green color from becoming bluish. In a case where a video signal resulting from the conversion of an image of a blue object is output by the camera, correction is effected in a similar manner, and the value of the B−Y signal is reduced, thereby lowering the saturation of blue.

In this way, the circuit is capable of improving the color reproducibility of a video signal output by a single-plate complementary-color mosaic-type color video camera.

Figure 4:
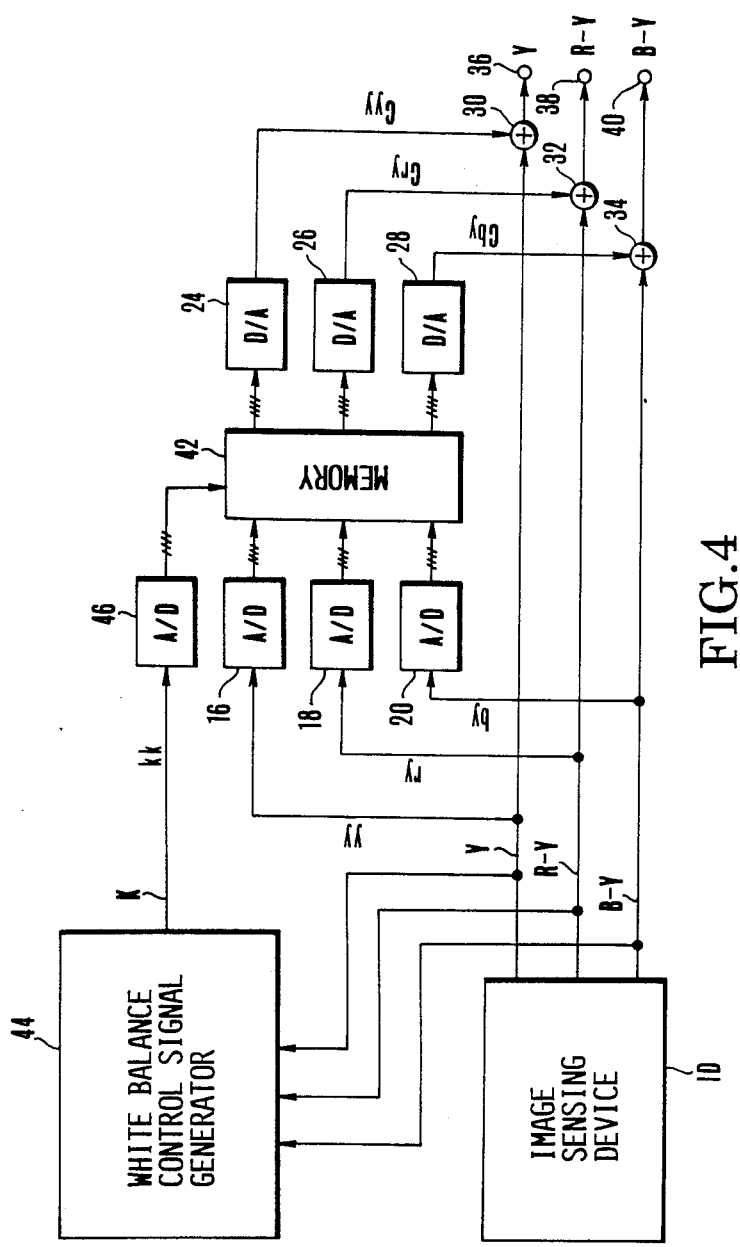
FIG. 4 is a block diagram showing the structure of a second embodiment of the present invention.
Figure 5:
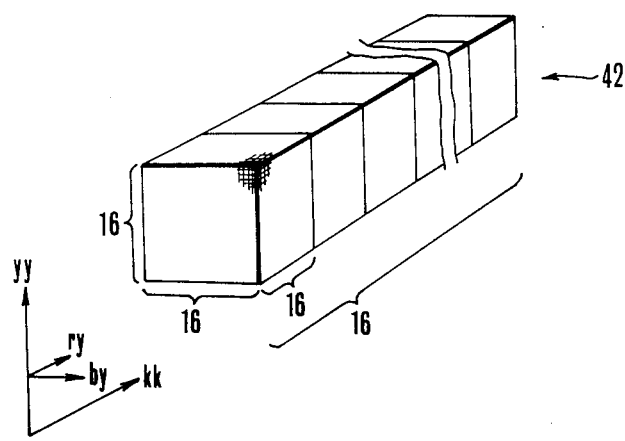
FIG. 5 is a view showing an image of correction data stored in a memory 42, shown in FIG. 4.

FIG. 4 is a block diagram showing the structure of a color correction circuit in accordance with a second embodiment of the present invention. The same components as those in FIG. 1 are designated by the same reference numerals. Reference numeral 42 designates a memory used in place of the memory 22 shown in FIG. 1, which has a capacity corresponding to 65,536×12 bits of data. The circuit includes an image sensing device ID, a white balance control signal generator 44, and a 4-bit A/D converter 46. The white balance control signal generator 44 obtains a white balance control signal K on the basis of signals Y, R−Y, and B−Y which are contained in an output of the image sensing device ID. In this embodiment, the selection of correction data, i.e., the correction characteristic, is varied in accordance with the white balance control signal K. FIG. 5 shows an image of correction data stored in the memory 42. The symbol "kk" designates a coordinate axis pertaining to the value of the white balance control signal K.

In the embodiment shown in FIG. 1, the memory 22 may be either a read-only-memory (the so-called ROM) or a RAM which allows both reading and writing. However, the use of a ROM is preferred if the memory is used to store correction data set in accordance with a video camera or camera of a particular type and, hence, solely to attain the correct color reproducibility, with no special effect being provided. On the other hand, the use of a RAM is preferred if it is desired that the ability to effect color correction should be adjustable freely. There are other arrangements which may be adopted in this case. For instance, a plurality of memories may be prepared for storing a plurality of groups of correction data corresponding to various different image sensing systems, and these memories may be replaced or selected by the changeover action of a switching means. Methods which are more commonly adopted include a method in which a plurality of ROMs or RAMs are capable of being manually or automatically selected freely in accordance with the intended correction, and a method in which the contents stored in the memory 22 are altered by a microcomputer, thereby enabling color correction to be effected with a wider variety. In this way, in the case of the second embodiment, the possible application of the apparatus includes, in addition to the improvement of color reproducibility, the provision of special effects.

Figure 6A:
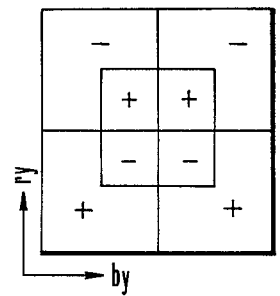
FIGS. 6(a), 6(b) and 6(c) are views used to explain correction data stored in the memory 22 for attaining special effects.
Figure 6B:
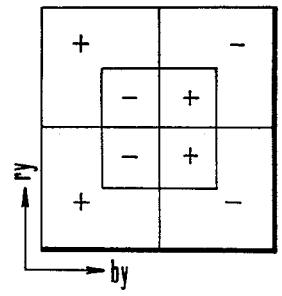
Figure 6C:
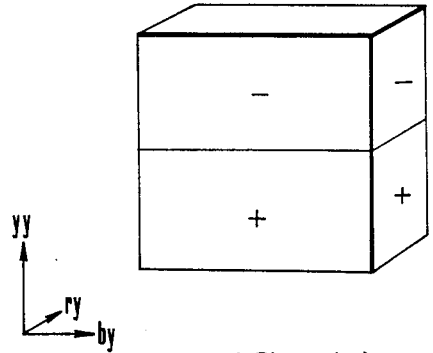

FIGS. 6(a), 6(b) and 6(c) show images of correction data stored in the memory 22, which are used to provide a special effect whereby an image is modified. FIG. 6(a) shows the distribution of data for correcting the color-difference signal R−Y at a certain luminance, FIG. 6(b) shows the distribution of data for correcting the color-difference signal B−Y at a certain luminance, and FIG. 6(c) shows the distribution of data for correcting the luminance signal Y. When the contents of the memory 22 are those shown in FIGS. 6(a) to 6(c), the image obtained from video signals output through the output terminals 30, 32 and 34 is an image having, e.g., a constant luminance and a constant saturation. If the value and/or the distribution of the correction data stored in the memory 22 or 42 is varied, it is possible to provide various different special effects.

Although in the foregoing embodiments, each of the A/D converters and the D/A converters is a 4-bit converter, it would be naturally understood that converters which may be used in the present invention are not limited to 4-bit converters. Further, although in the foregoing embodiment, a color video signal comprising a luminance signal and color-difference signals is subjected to color correction, this is a mere example; it would be naturally understood that the arrangement of the present invention may also be applied to a case where the signal to be processed comprises component signals different from those described above.

What is claimed is:

1. A color correction apparatus comprising:
   (a) A/D conversion means for performing A/D conversion of each of a luminance signal and color-difference signals included in an input signal;
   (b) a memory having stored color correction data in addresses corresponding to outputs of said A/D conversion means; and
   (c) calculating means for performing calculation on outputs of said memory as well as the luminance signal and the color-difference signals.

2. A color correction apparatus according to claim 1, wherein said color-difference signals include components indicative of R−Y and B−Y.

3. A color correction apparatus according to claim 1, wherein said calculating means includes adding means.

4. A color correction apparatus according to claim 1, wherein said memory stores different items of color correction data corresponding to a color temperature of an object.

5. A color correction apparatus according to claim 1, further comprising image sensing means for supplying to said A/D conversion means an image signal as the input signal.

6. A color correction apparatus according to claim 5, further comprising white balance control means for forming a white balance control signal for controlling the white balance of an output of said image sensing means in accordance with a color temperature of an object whose image is sensed by said image sensing means.

7. A color correction apparatus according to claim 6, wherein said white balance control means forms the white balance control signal in accordance with the output of said image sensing means.

8. A color image sensing apparatus comprising:
   (a) image sensing means for sensing an image of an object;
   (b) a memory having stored color correction data corresponding to a predetermined color signal included in an output of said image sensing means and a color temperature of the object; and
   (c) correction means for correcting an output of said image sensing means by using an output of said memory.

9. A color image sensing apparatus according to claim 8, wherein said color signal includes color-difference signals.

10. A color image sensing apparatus according to claim 9, wherein said color-difference signals include components indicative of R−Y and B−Y.

11. A color image sensing apparatus according to claim 8, wherein said correction means includes calculating means for performing calculation on the output of said memory and the output of said image sensing means.

12. A color image sensing apparatus according to claim 11, wherein said calculating means includes adding means.

13. A color image sensing apparatus according to claim 8, further comprising white balance control means for forming a white balance control signal for controlling the white balance of the output of said image sensing means in accordance with a color temperature of an object whose image is sensed by said image sensing means.

14. A color image sensing apparatus according to claim 13, wherein said white balance control means forms the white balance control signal in accordance with the output of said image sensing means.

* * * * *